United States Patent
Okamura et al.

(10) Patent No.: US 7,130,064 B1
(45) Date of Patent: Oct. 31, 2006

(54) IMAGE PROCESSING APPARATUS AND METHOD SELECTIVELY UTILIZING LOWER THAN NORMAL IMAGE RECORDING DENSITY

(75) Inventors: Koji Okamura, Toride (JP); Naoya Watanabe, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 705 days.

(21) Appl. No.: 09/598,201

(22) Filed: Jun. 21, 2000

(30) Foreign Application Priority Data

Jun. 25, 1999 (JP) .................. 11-180001

(51) Int. Cl.
*G06F 15/00* (2006.01)

(52) U.S. Cl. .................................... 358/1.13

(58) Field of Classification Search ............... 358/1.1, 358/1.9, 1.11–1.18, 462, 403, 404, 444, 448, 358/452, 298; 347/118; 399/299; 382/298
See application file for complete search history.

(56) References Cited

U.S. PATENT DOCUMENTS

| | | | | |
|---|---|---|---|---|
| 4,876,612 A | | 10/1989 | Honma et al. | 358/474 |
| 5,283,667 A | * | 2/1994 | Kojima et al. | 358/462 |
| 5,455,895 A | * | 10/1995 | Hattori | 358/1.13 |
| 5,751,433 A | * | 5/1998 | Narendranath et al. | 358/1.9 |
| 6,204,867 B1 | * | 3/2001 | Fujimoto et al. | 347/118 |
| 6,356,358 B1 | * | 3/2002 | Kakutani et al. | 358/1.7 |
| 6,438,274 B1 | * | 8/2002 | Tokuyama et al. | 382/298 |

FOREIGN PATENT DOCUMENTS

| | | | |
|---|---|---|---|
| JP | 3-57083 | | 3/1991 |
| JP | 8-130637 | | 5/1996 |
| JP | 08130637 A | * | 5/1996 |
| JP | 10097161 A | * | 4/1998 |
| JP | 11099728 A | * | 4/1999 |

* cited by examiner

*Primary Examiner*—Gabriel Garcia
*Assistant Examiner*—Thierry L. Pham
(74) *Attorney, Agent, or Firm*—Fitzpatrick, Cella, Harper & Scinto (57) ABSTRACT

An image processing system includes an input unit, a selecting unit, a determining unit and a control unit. The input unit inputs one of a color image and a monochrome image, and the selecting unit selects either a normal recording mode for recording an image on a recording material at a predetermined recording density, and a decimation recording mode for recording the image on the recording material at a recording density lower than that of the normal recording mode. The determining unit determines if the input image is a color image or a monochrome image, and the control unit changes to the normal recording mode, when the decimation recording mode is selected and the input image is determined to be a color image.

44 Claims, 4 Drawing Sheets

IMAGE PROCESSING APPARATUS AND METHOD SELECTIVELY UTILIZING LOWER THAN NORMAL IMAGE RECORDING DENSITY

BACKGROUND OF THE INVENTION

1. Field of the Invention

The present invention relates to image processing apparatuses and image processing methods, and more particularly relates to an image processing apparatus and an image processing method suitable for a facsimile apparatus or the like including a recording unit using an ink-jet recording system.

2. Description of the Related Art

Recently, color facsimile communication has been standardized by the International Telecommunication Union-Telecommunication Standardization Sector (ITU-T), and facsimile apparatuses for compressing and communicating a color image in a Joint Photographic Experts Group (JPEG) compression system are well known. A recording unit in this type of facsimile apparatus is provided with a recorder using a laser beam system or using an ink jet system. In particular, facsimile apparatuses with a recording unit using the ink jet system capable of recording color images at low cost are widely disseminated.

Image recording apparatuses using laser systems, and particularly those using ink jet systems, have ink droplets of uniform size for recording a solid black portion when recording a thin line. The conventional image recording apparatuses are disadvantageous in that ink droplets of a size adequate for clearly recording the thin line are excessive for recording the solid black portion. Although it may depend on the quality of the paper or on the recording environment, an ink droplet for one dot tends to bleed in the paper, thus printing on an area larger than the target resolution of one dot. This problem is caused by characteristics of ink-jet recording, and the excessive ink noticeably accumulates in the black solid portion.

Due to the excessive amount of ink, an image, immediately after being printed, is output which is black and wet due to the ink. This may cause smearing which may spoil a next page, and the ink may soil a user. The excessive ink may also cause the paper to kink and crinkle. This causes waste not only of ink for recording but also of power consumption for recording.

Accordingly, there has been proposed an apparatus for decimating recording dots so as to conserve ink to be used and to reduce power consumption during recording, and to provide countermeasures against black-wetting and smearing. The user can set the apparatus to perform decimation, thus reducing ink consumption and the operating cost.

Decimation includes two types of processing. One is unconditional decimation for unconditionally zigzag-converting black pixels into white pixels. The other is reference-conditional decimation, as disclosed in Japanese Laid-Open Patent No. 8-130637, for referring to states of pixels adjacent to a pixel to be decimated and for determining whether to decimate the pixel.

Hitherto, once the user has set the apparatus in a decimation recording mode, the apparatus always performs decimation regardless of the type of image to be recorded, whether it is a monochrome character image, a monochrome halftone image, or a color image.

The monochrome halftone image and the color image are images obtained by printing beautifully pictures and photographs. When a subject-copy image is read and converted into recording data, that is, binary data, halftoning, such as error diffusion processing, is performed.

For example, when multi-valued color image data obtained by reading a color subject copy is converted into a binary color image, color-difference data generated by peripheral conversion is added to the multi-valued color data. Subsequently, the added data is converted into a predetermined single color by comparison.

When the recording unit decimates and records the processed recording data, gray scaling and overall color balance are lost, thus providing the user with an undesirable output image.

Since the monochrome halftone image is binarized by error diffusion processing, the image will lose gray scaling when decimated and the image quality becomes substantially degraded.

SUMMARY OF THE INVENTION

Accordingly, it is an object of the present invention to provide an image processing apparatus and an image processing method for solving or minimizing the problems described in the related art. Even when a second recording mode is selected for recording an image on a recording material at a recording density lower than a predetermined recording density, if the type of the image is determined and as a result the second recording mode is determined to be inappropriate, the recording mode is changed to a first recording mode for recording the image at the predetermined recording density. Therefore, decimation of a color image or a halftone image is prohibited, thus preventing the image quality from being degraded.

It is another object of the present invention to provide an image processing apparatus and an image processing method including a first recording mode for performing unconditional decimation, a second recording mode for referring to images of pixels surrounding a pixel to be decimated and then performing decimation, and a third recording mode in which decimation is not performed. Even when the first or the second mode has been selected, the recording mode is changed to the third recording mode for color images. This prohibits decimation of the color image, thus preventing the quality of the color image from being degraded.

It is another object of the present invention to provide an image processing apparatus and an image processing method including a first recording mode for performing unconditional decimation, a second recording mode for referring to pixels surrounding a pixel to be decimated and then performing decimation, and a third recording mode for not performing decimation. Even when the first recording mode has been selected, the recording mode is changed to the second recording mode for monochrome halftone images. This reduces degradation of image quality caused by decimation.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in, and constitute a part of, the specification, illustrate embodiments of the invention, and together with the description, serve to explain the principles of the invention.

DESCRIPTION OF THE PREFERRED EMBODIMENTS

Preferred embodiments of the present invention will now be described in detail in accordance with the accompanying drawings.

Figure 1:
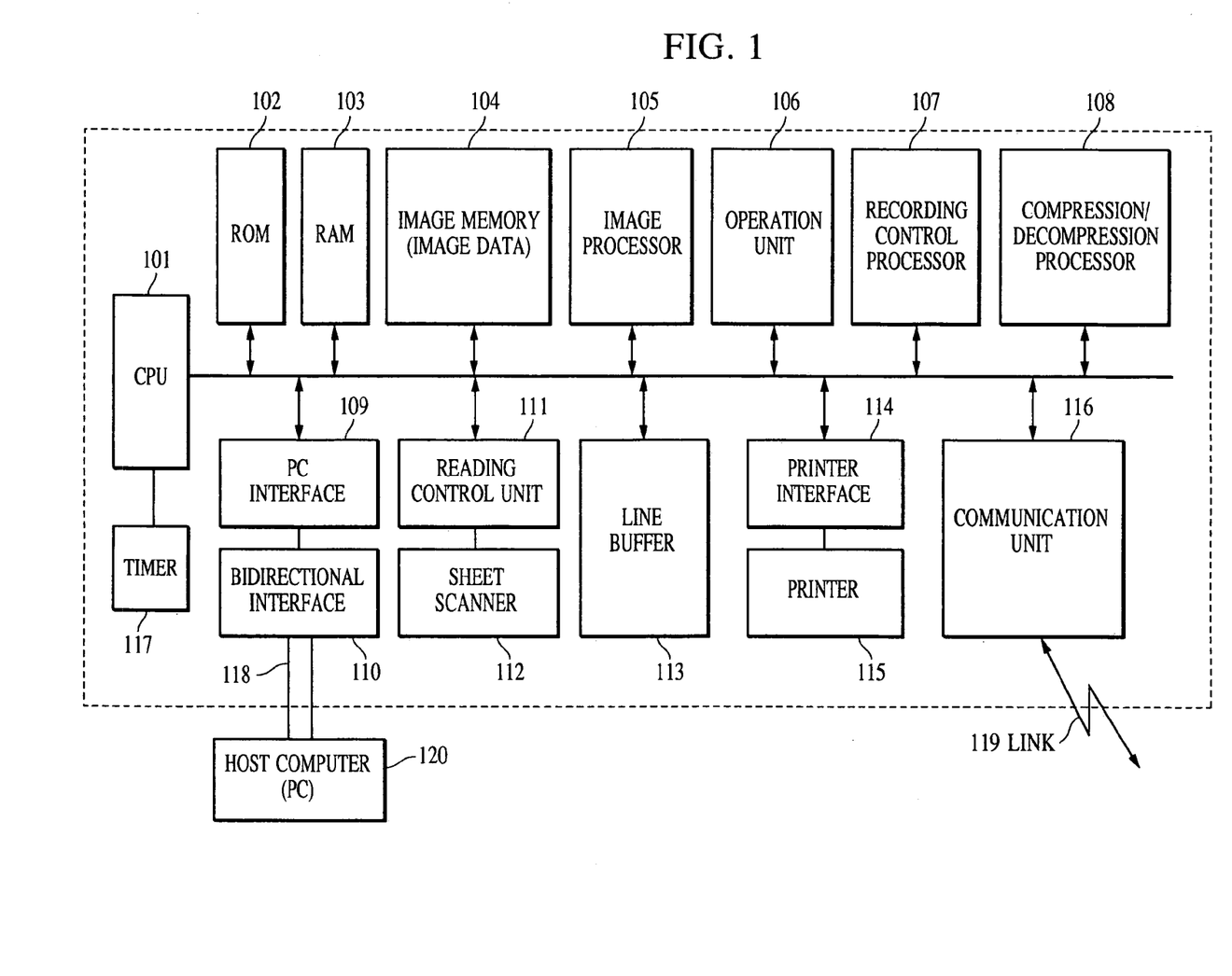
FIG. 1 is a block diagram of the structure of a facsimile apparatus according to an embodiment of the present invention.

FIG. 1 shows the structure of a facsimile apparatus according to an embodiment of the present invention.

The facsimile apparatus is capable of performing normal monochrome-mode copying and communication, color copying, and color communication.

Referring to FIG. 1, a CPU 101 is a system controller for controlling the overall facsimile apparatus.

A ROM 102 is a memory for storing a control program of the CPU 101.

A RAM 103 includes, for example, a static random access memory (SRAM), and stores program control variables and the like. The RAM 103 functions as various work buffers for buffering set values registered by a user and management data of the apparatus.

An image memory 104 includes, for example, a dynamic random access memory (DRAM), and stores image data of a plurality of pages. The image memory 104 stores binary data, obtained by converting multi-valued data obtained by reading a subject-copy image, and binary data obtained by decoding encoded data received from another communication apparatus.

An image processor 105 performs edge enhancement, luminance-density conversion, and resolution conversion including millimeter-inch conversion. In addition, the image processor 105 performs image processing including character binarization for converting multi-valued image data obtained by reading a subject copy into binary data in a character mode at a predetermined threshold, and halftone binarization for converting multi-valued data obtained by reading a subject copy into binary data in a halftone mode by means of error diffusion processing. The image processor 105 decimates binary data stored in the image memory 104 in accordance with a selection made by the user.

An operation unit 106 performs various inputting operations and includes a keyboard or the like.

A recording control processor 107 converts binary data into a native command for recording.

A compression/decompression processor 108 performs encoding and decoding in systems including JPEG, modified Huffman (MF) coding, modified READ (MR) coding, and modified MR (MM) coding.

A PC interface 109 interfaces a host computer (PC) 120. A bidirectional interface 110 is formed by a Standard No. P1264 Bi-Centronics interface and performs bidirectional interfacing with the PC 120.

A reading control unit 111 controls the quantity of light when reading a subject copy.

A sheet scanner 112 includes a CS image sensor, a copy feeder, and the like. The sheet scanner 112 optically reads an image on a subject copy and converts the image into electrical image data. In this embodiment, the sheet scanner 112 can read a color subject copy.

A line buffer 113 is employed when controlling transfer of image data.

A printer interface 114 analyzes a printer description language and converts the language into image data.

A printer 115 uses an ink jet system and includes a recording unit for recording an image obtained by reading a subject-copy image, a received image, or a file image from the PC. In this embodiment, the printer 115 is a color ink jet printer capable of recording a color image.

A communication unit 116 performs communication with other communication apparatuses. The communication unit 116 includes a modulator-demodulator (MODEM), a network control unit (NCU), and the like.

A timer 117 measures an operation interval and includes a clock IC and the like.

The facsimile apparatus further includes a Bi-Centronics interface cable 118 for connecting the bidirectional interface 110 and a host computer (PC) 120 and a public link 119.

Figure 2:
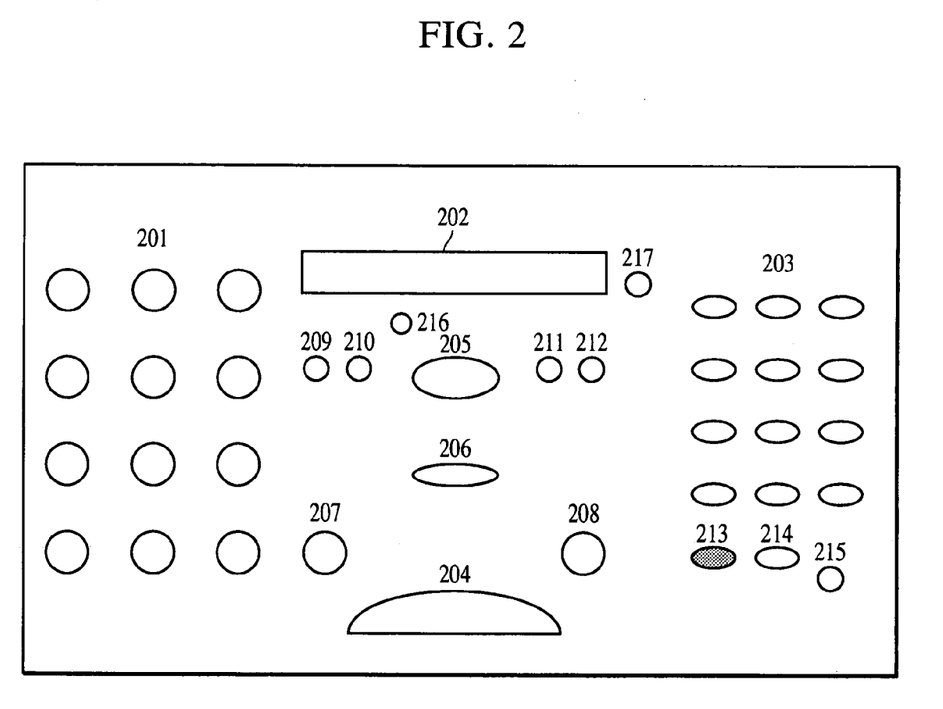
FIG. 2 is an illustration of details of the operation unit 106 of FIG. 1.

FIG. 2 shows details of the operation unit 106 shown in FIG. 1.

Referring to FIG. 2, a numeric keypad 201 is employed for dialing phone numbers and for performing various settings. A liquid crystal display (LCD) 202 displays information for instructing operations and the like. A one-touch key 203 is used for dialing phone numbers and for performing various settings. A start key 204 starts copying, communication, and the like. A mode key 205 switches between a color mode and a monochrome mode. A key 206 switches the resolution. A hook key 207 acquires the link 119. A stop key 208 stops each process. In addition, the operation unit 106 includes a redial/pause key 209, an abbreviated dialing key 210, a key 211 for selecting a reception mode, a copy mode key 212, and a function mode key/lamp 213 for performing various settings. In this embodiment, the function mode key 213 is used to select between a normal mode for recording at a predetermined density and a mode (decimation mode) for recording at a recording density lower than the predetermined density. A set key 214 confirms the processing when various settings are determined. An error canceling key 215 performs recovery processing when there is any error in the recording unit. The operation unit 106 further includes an operation display lamp 216 for displaying color operation or monochrome operation and a status display lamp 217 for displaying states of various errors.

Next, a process of recording by the facsimile apparatus of the embodiment is described.

Figure 3:
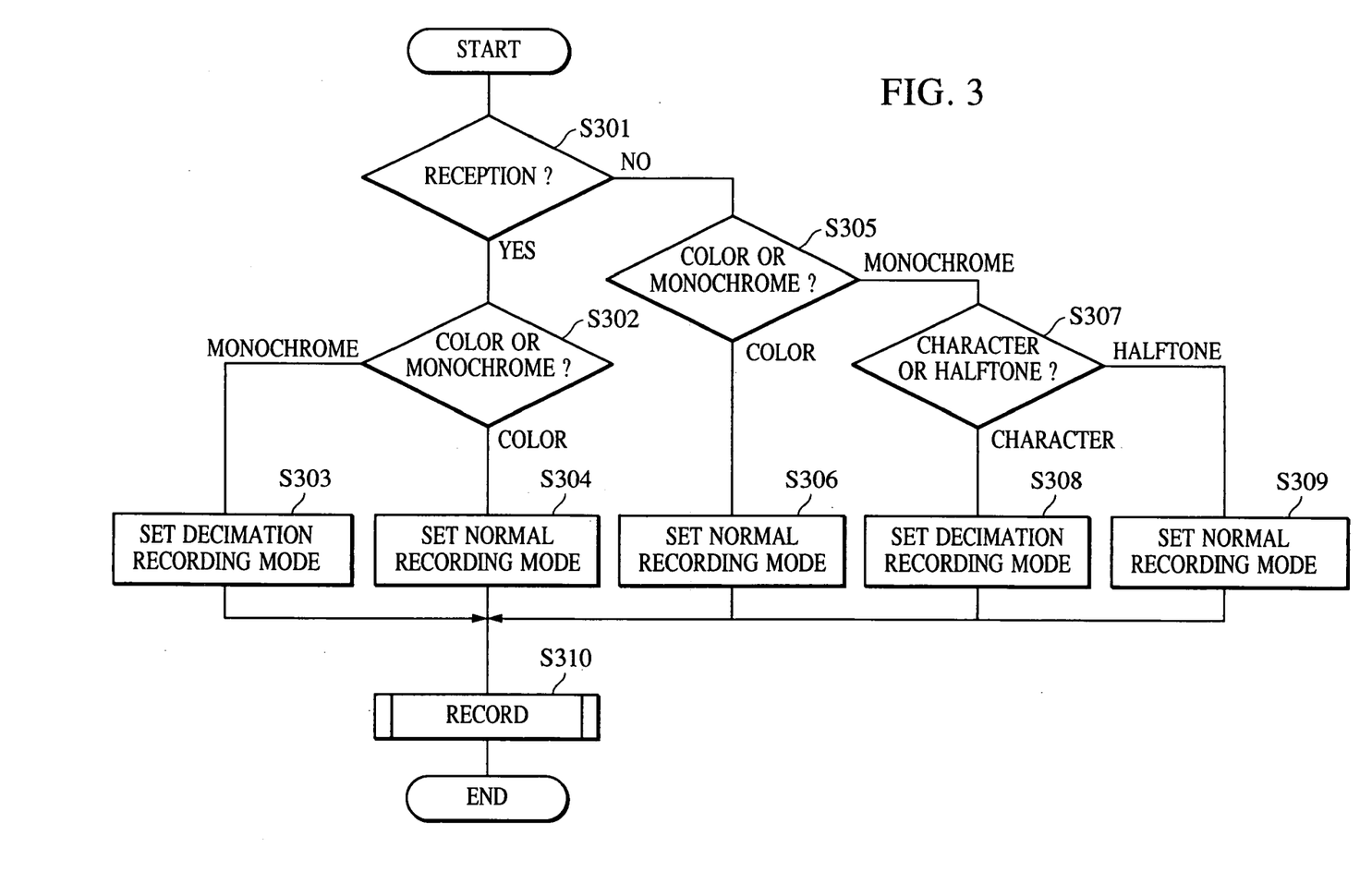
FIG. 3 is a flowchart describing a recording process of the embodiment.

FIG. 3 is a flowchart describing the recording process stored in the ROM 102 and performed by the CPU 101.

The process shown in FIG. 3 is performed assuming that the image processor 105 shown in FIG. 1 includes one type of decimation process. This decimation process unconditionally zigzag-converts black pixels in the entirety of an image to be decimated/recorded into white pixels, and records the image. The user employs the function mode key 213 of the operation unit 106 to select whether to perform decimation.

Referring to FIG. 3, the operation is described. In the following description, it is assumed that the user has selected a decimation mode.

In step S301, the process determines whether the recording process is a reception recording process based on a received image or a copy recording process in the copy mode. If the recording process is the reception recording process, the process determines in step S302 whether the received image is a color image or a monochrome image. The determination is performed based on a signal exchanged with another apparatus. If the received image is a monochrome image, the process sets the decimation mode in step S303. (This is because the user has selected the decimation mode.) If it is determined in step S302 that the received image is a color image, the process cancels the setting in step S303 even when the user has set the decimation mode, and changes the setting to a normal recording mode in step S304. This prevents the color image from being decimated, thus preventing the image quality from being degraded.

If it is determined in step S301 that the recording process is the copy recording process in the copy mode, the process determines in step S305 whether an image to be recorded is a color image or a monochrome image. If the image is a color image, as in step S304, the process cancels the setting determined by the user and sets the normal recording mode in step S306, thus preventing the image quality from being degraded. If it is determined in step S305 that the image is a monochrome image, the process determines in step S307 whether the image to be recorded is a character image binarized in a character mode or a halftone image binarized in a halftoning mode. The determination is performed based on information obtained by binary processing performed by the apparatus. If it is determined in step S307 that the image is a character image, the process sets the decimation mode in step S308 based on the setting determined by the user. In contrast, if it is determined in step S307 that the image is a halftone image, the process cancels the setting determined by the user, and sets in step S309 the normal recording mode in which decimation is not performed.

In step S310, the process records the image in the set mode.

According to the embodiment, even when the decimation mode for recording at a recording density lower than the predetermined density is selected, if the decimation recording mode is determined to be unsuitable as a result of determining the type of image, the recording mode is switched to the normal recording mode for recording at the predetermined density. This prohibits decimation recording of a color image or a halftone image, thus preventing the image quality of such an image from being degraded.

According to the embodiment shown in FIG. 3, decimation of the halftone image is prohibited exclusively in the copy mode by discriminating between the character image and the halftone image. For the received image, it is possible to discriminate between the character image and the halftone image. As disclosed in Japanese Patent Laid-Open No. 3-57083, the discrimination can be made based on dot arrangement of received binary data.

Specifically, by using this discrimination process, it is possible to discriminate between a character image and a halftone image in the received image and thereby prohibit decimation of the halftone image.

A recording process according to another embodiment is described hereinafter.

Figure 4:
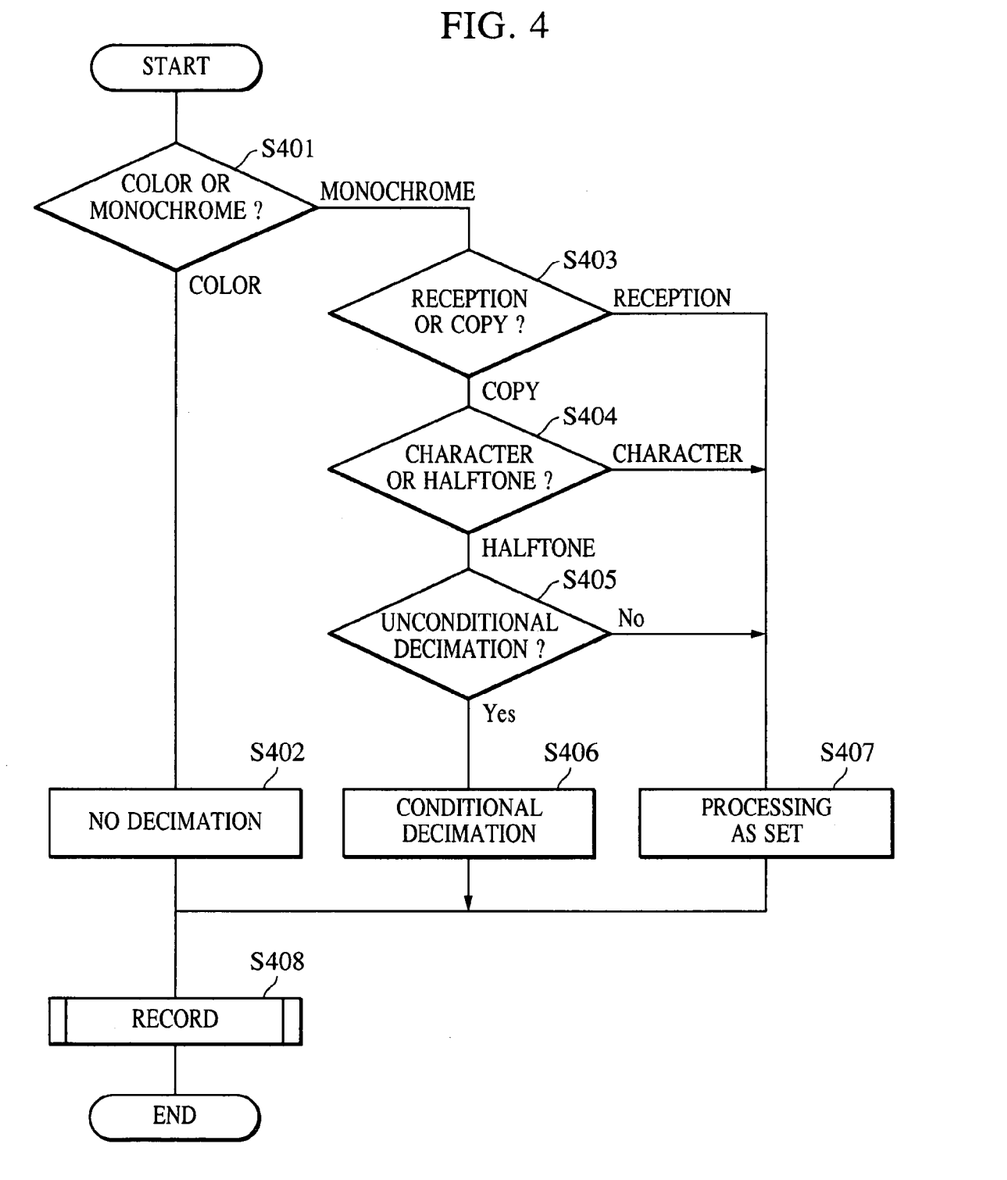
FIG. 4 is a flowchart describing a recording process of another embodiment.

FIG. 4 is a flowchart describing the process stored in the ROM 102 and performed by the CPU 101.

The process shown in FIG. 4 is performed assuming that the image processor 105 shown in FIG. 1 includes two types of decimation process. One type is unconditional decimation for unconditionally zigzag-converting black pixels into white pixels and thus recording. The other type is reference-conditional decimation for referring to images of pixels surrounding an input image and decimating the input image. The conditional decimation process, as disclosed in Japanese Patent Laid-Open No. 8-130637, determines states of pixels surrounding a black pixel to be decimated. If all the pixels surrounding the black pixel to be decimated are black, the central black pixel is converted to a white pixel.

The user employs the function mode key 213 of the operation unit 106 to select whether to perform decimation. When performing decimation, the user can select between unconditional decimation and conditional decimation.

Referring to FIG. 4, this recording process is described below.

In step S401, the process determines whether an image to be recorded is a color image or a monochrome image. If the image is a color image, the process proceeds to step S402. If the image is a monochrome image, the process proceeds to step S403. In step S402, the process cancels the selection and sets the normal recording mode in which decimation is not performed, even when the user has selected conditional or unconditional decimation. Accordingly, decimation of a color image is prohibited, thus preventing the color image from being degraded.

In step S403, the process determines whether the image to be recorded is a received image or a copy-mode image. If the image is a received image, the process proceeds to step S407. If the image is a copy-mode image, the process proceeds to step S404. In step S407, the process sets the mode set by the user.

In step S404, the process determines whether the image to be recorded is a character image binarized in a character mode or a halftone image binarized in a halftoning mode. This determination is made based on information obtained when the image has been binarized by the apparatus. If it is determined in step S404 that the image is a character image, the process sets the mode set by the user in step S407.

If it is determined in step S404 that the image is a halftone image, the process determines in step S405 whether unconditional decimation is selected. If the determination is negative, the process sets the mode set by the user in step S407.

If it is determined in step S405 that unconditional decimation is set, the process cancels the setting determined by the user since the quality of a monochrome halftone image is degraded when the image is decimated. The process sets conditional decimation, which does not involve degradation of the quality of a halftone image. An image halftoned by error diffusion processing includes a number of isolated dots in a bright region. Since conditional decimation for exclusively decimating a black pixel when all the pixels surrounding the black pixel are black does not decimate these isolated dots, the quality of the halftone image is not degraded. In the error diffusion processing, since a black solid portion insignificantly influenced by decimation is dense with dots, this portion is decimated.

In step S408, the process records the image in the set mode.

According to the above embodiment shown in FIG. 4, the process includes a first recording mode for performing unconditional decimation, a second recording mode for referring to pixels surrounding a pixel to be decimated and then decimating the pixel, and a third recording mode in which decimation is not performed. Even when the first or the second recording mode has been selected, if an image to be recorded is a color image, the recorded mode is changed to the third recording mode. This reduces degradation of image quality caused by decimating the color image.

In addition, the process includes the first recording mode for performing unconditional decimation, the second recording mode for referring to pixels surrounding a pixel to be decimated and then decimating the pixel, and the third recording mode in which decimation is not performed. Even when the first recording mode has been selected, if an image to be recorded is a monochrome halftone image, the recording mode is changed to the second recording mode. This reduces degradation of image quality caused by decimating the monochrome halftone image.

According to the embodiment shown in FIG. 4, the character image and the halftone image are discriminated between only in the copy mode, and the halftone image is conditionally decimated. Alternatively, it is possible to discriminate between character images and halftone images in the received image.

As disclosed in Japanese Laid-Open Patent No. 3-57083, this discrimination is made based on dot arrangement of received binary data.

Specifically, with this discrimination process, character images and halftone images are discriminated between in the received image, thus setting conditional decimation for the halftone image.

In FIGS. 3 and 4, the type of image is determined in units of a page, and the recording mode is set in units of a page. Therefore, if recording images of a plurality of pages include a mixture of color images, monochrome images, character images, and halftone images, an appropriate recording mode can be set for each page.

While the present invention has been described with reference to the preferred embodiments, it is to be understood that the invention is not limited to these embodiments and includes various modifications. Although the present invention has been described in the context of a facsimile apparatus by way of example, the present invention is also applicable to a copy machine or to a printer. The recording unit employed in the above embodiments is not limited to that used in the ink jet system, and may be used in the laser system.

The present invention is applicable to a system including a plurality of devices, such as a host computer, an interface device, a reader, and a printer.

The present invention is applicable to a storage medium for storing a program code of software executing the functions of the above embodiments. By providing a system or an apparatus with the storage medium, a computer (alternatively, a CPU or an MPU) of the system or the apparatus can read the program code stored in the storage medium, thus executing the functions.

In this case, since the functions of the above embodiments are executed by the program code read from the storage medium, the present invention is formed by the storage medium storing the program code.

The storage medium for providing the program code includes, for example, a floppy disk, a hard disk, an optical disk, a magneto-optical disk, a CD-ROM, a CD-R, a magnetic tape, a non-volatile memory card, or a ROM.

By executing the program code read by the computer, the functions of the above embodiments are executed. Of course, the functions can be executed by an operating system running on the computer or the like which performs part or all of the actual processing based on instructions of the program code.

In addition, the program code read from the storage medium can be written in an add-in board inserted in the computer or in an add-in unit connected to the computer. Subsequently, a CPU or the like included in the add-in board or the add-in unit can perform part or all of the actual processing, thus performing the functions of the above embodiments.

As described above, according to the present invention, even when a decimation recording mode is selected for recording an image on a recording material at a recording density lower than a predetermined recording density, if it is determined that the decimation recording mode is not appropriate as a result of determining the type of the image, the recording mode is changed to a normal recording mode for recording an image at the predetermined recording density. This prohibits decimation of a color image or a halftone image, thus preventing the image quality from being degraded.

According to the present invention, there are a first recording mode for performing unconditional decimation, a second recording mode for referring to pixels surrounding a pixel to be decimated and then performing decimation, and a third recording mode for not performing decimation. For a monochrome halftone image, the recording mode is changed to the second recording mode even when the first recording mode has been selected, thus preventing the image quality from being degraded by decimation of the monochrome halftone image.

As many apparently widely different embodiments of the present invention can be made without departing from the spirit and scope thereof, it is to be understood that the invention is not limited to the specific embodiments herein except as claimed in the appended claims.

What is claimed is:

1. An image processing apparatus comprising:
    input means for inputting an image of one of a plurality of image types;
    image processing means for generating a recording image data based on the input image, the image processing means being capable of generating first recording image data for recording the image on a recording material at a predetermined recording density, and second recording image data for recording the image on a recording material at a recording density lower than that of the first recording image data, by reducing the number of recording dots through decimation;
    selecting means for use of an operator in selecting a recording mode from among a first recording mode, for recording the first recording image data, and a second recording mode, for recording the second recording image data;
    determining means for determining if the input image is a predetermined image type; and
    control means for changing to the first recording mode which does not carry out said decimation, when the input image is a color image type or a monochrome halftone image type, whereby the second recording mode which carries out said decimation for generating deterioration for image gradation as selected by the operator is canceled.

2. An image processing apparatus according to claim 1, further comprising a recording means for recording the first recording image data or the second recording image data, according to the mode being used.

3. An image processing apparatus according to claim 1, wherein said input means inputs one-pixel binary image data.

4. An image processing apparatus according to claim 3, wherein said input means inputs one of binary data received from another communication apparatus and binary data obtained by binarizing multi-valued image data obtained by reading a subject copy.

5. An image processing apparatus according to claim 1, wherein the predetermined image type is a color image, and said determining means determines whether the input image is a monochrome image or a color image; and
    said control means changes to the first recording mode, when the second recording mode is selected by the operator, and said determining means determines that the input image is a color image whereby the recording mode selected by the operator is canceled.

6. An image processing apparatus according to claim 1, wherein when the input image type is a monochrome image, and said determining means determines whether the monochrome image is a character image or a halftone image; and
    said control means changes to the first recording mode, when the second recording mode is selected by the operator, and said determining means determines that the monochrome image is a halftone image whereby the recording mode selected by the operator is canceled.

7. An image processing apparatus according to claim 1, wherein said input means inputs an image having a plurality of pages;
    said determining means determines the image type of the input image in units of a page; and said control means controls the recording mode in units of a page.

8. An image processing apparatus comprising:
input means for inputting an image of one of a plurality of image types;
image processing means for generating recording image data based on the input image, the image processing means being capable of generating first recording image data for unconditionally decimating the image data, and second recording image data for conditionally decimating the image data;
selecting means for use of an operator in selecting a recording mode from among a first recording mode, for recording the first recording image data on a recording material, a second recording mode, for recording the second recording image data on the recording material, and a third recording mode, for recording third recording image data on the recording material, the third image data being obtained from the input image without decimating the image;
determining means for determining if the input image is a predetermined image type; and
control means for changing to the third recording mode which carries out neither unconditional nor conditional decimation, when the input image is a monochrome halftone image type, whereby the first recording mode which carries out unconditional decimation as selected by the operator is canceled.

9. An image processing apparatus according to claim 8, further comprising a recording means for recording the first, second, or third recording image data.

10. An image processing apparatus according to claim 8, wherein said input means inputs one-pixel binary image data.

11. An image processing apparatus according to claim 10, wherein said input means inputs one of binary data received from another communication apparatus and binary data obtained by binarizing multi-valued image data obtained by reading a subject copy.

12. An image processing apparatus according to claim 8, wherein the predetermined image type is a color image, and said determining means determines whether the input image is a monochrome image or a color image; and
said control means changes to the third recording mode, when the first or the second recording mode is selected, and said determining means determines that the input image is a color image whereby the selected recording mode is canceled.

13. An image processing apparatus according to claim 8, wherein said input means inputs an image having a plurality of pages;
said determining means determines the image type of the input image in units of a page; and
said control means controls the recording mode in units of a page.

14. An image processing method comprising:
an inputting step, of inputting an image of one of a plurality of image types;
an image processing step, of generating recording image data based on the input image, the image processing step including generating any of first recording image data, for recording the image on a recording material at a predetermined recording density, and second recording image data for recording the image on a recording material at a recording density lower than that of the first recording image data, by reducing the number of recording dots through decimation;
a selecting step, of an operator selecting a recording mode from among a first recording mode, for recording the first recording image data, and a second recording mode, for recording the second recording image data;
a determining step, of determining if the input image is a predetermined image type; and
a controlling step, of changing to the first recording mode which does not carry out said decimation, when the input image is a color type or a monochrome halftone image type, whereby the second recording mode which carries out said decimation for generating deterioration for image gradation as selected by the operator is canceled.

15. An image processing method according to claim 14, further comprising a recording step, of recording the first or the second recording image data.

16. An image processing method according to claim 14, wherein said inputting step includes inputting one-pixel binary image data.

17. An image processing method according to claim 14, wherein the second recording mode is for decimating and recording the input image.

18. An image processing method according to claim 16, wherein said inputting step includes inputting binary data received from another communication apparatus or binary data obtained by binarizing multi-valued image data obtained by reading a subject copy.

19. An image processing method according to claim 14, wherein the predetermined image type is a color image, and said determining step includes determining whether the input image is a monochrome image or a color image; and
said controlling step includes changing to the first recording mode, when the second recording mode is selected, and it is determined in said determining step that the input image type is a color image whereby the recording mode selected by the operator is canceled.

20. An image processing method according to claim 14, wherein the input image type is a monochrome image, and said determining step includes determining whether the monochrome image is a character image or a halftone image; and
said controlling step includes changing to the first recording mode, when the second recording mode is selected by the operator, and it is determined in said determining step that the monochrome image is a halftone image whereby the recording mode selected by the operator is canceled.

21. An image processing method according to claim 14, wherein:
said inputting step includes inputting an image having a plurality of pages;
said determining step includes determining the image type of the input image in units of a page; and
said controlling step includes controlling the recording mode in units of a page.

22. An image processing method comprising:
an inputting step, of inputting an image of one of a plurality of image types;
an image processing step, of generating recording image data based on the input image, the image processing step including generating any of first recording image data for unconditionally decimating the image data, and second recording image data for conditionally decimating the image data;
a selecting step, of selecting by an operator a recording mode from among a first recording mode, for recording the first recording image data on a recording material, a second recording mode, for recording the second recording image data on the recording material, and a third recording mode, for recording third recording image data;

a determining step, of determining if the image is a predetermined image type; and a controlling step, of changing to the third recording mode which carries out neither unconditional nor conditional decimation, when the input image is a monochrome halftone image type, whereby the first recording mode which carries out unconditional decimation as selected by the operator is canceled.

23. An image processing method according to claim 22, further comprising a recording step, of recording the first, second, or third recording image data.

24. An image processing method according to claim 22, wherein said inputting step includes inputting one-pixel binary image data.

25. An image processing method according to claim 24, wherein said inputting step includes inputting binary data received from another communication apparatus or binary data obtained by binarizing multi-valued image data obtained by reading a subject copy.

26. An image processing method according to claim 22, wherein the predetermined image type is a color image, and said determining step includes determining whether the input image is one of a monochrome image and a color image; and said controlling step includes changing to the third recording mode, when one of the first and second recording modes is selected, and it is determined in said determining step that the input image is a color image whereby the selected recording mode is canceled.

27. An image processing method according to claim 22, wherein:

said inputting step includes inputting an image having a plurality of pages;

said determining step includes determining the image type of the input image in units of a page; and said controlling step includes controlling the recording mode in units of a page.

28. A computer readable medium having recorded thereon executable codes for implementing a computer implementable image processing method comprising:

an inputting step, of inputting an image of one of a plurality of image types;

an image processing step, of generating recording image data based on the input image, the image processing step includes generating any of first recording image data for recording the image on a recording material at a predetermined recording density, and second recording image data for recording the image on a recording material at a recording density lower than that of the first recording image data, by reducing the number of recording dots through decimation;

a selecting step, of an operator selecting a recording mode from among a first recording mode, for recording the first recording image data, and a second recording mode, for recording the second recording image data;

a determining step, of determining if the input image is a predetermined image type; and a controlling step, of changing to the first recording mode which does not carry out said decimation, when the input image is a color image type or a monochrome halftone image type, whereby the second recording mode which carries out said decimation for generating deterioration for image gradation as selected by the operator is canceled.

29. A computer readable medium according to claim 28, the method further comprising a recording step, of recording the first or the second recording image data.

30. A computer readable medium according to claim 28, wherein said inputting step includes inputting one-pixel binary image data.

31. A computer readable medium according to claim 28, wherein the second recording mode is for decimating and recording the input image.

32. A computer readable medium according to claim 30, wherein said inputting step includes inputting one of binary data received from another communication apparatus and binary data obtained by binarizing multi-valued image data obtained by reading a subject copy.

33. A computer readable medium according to claim 28, wherein the predetermined image type is a color image, and said determining step includes determining whether the input image is a monochrome image or a color image; and said controlling step includes changing to the first recording mode, when the second recording mode is selected, and it is determined in said determining step that the input image type is a color image whereby the recording mode selected by the operator is canceled.

34. A computer readable medium according to claim 28, wherein the input image type is a monochrome image, and said determining step includes determining whether the monochrome image is a character image or a halftone image; and said controlling step includes changing to the first recording mode, when the second recording mode is selected by the operator, and it is determined in said determining step that the monochrome image is a halftone image whereby the recording mode selected by the operator is canceled.

35. A computer readable medium according to claim 28, wherein:

said inputting step includes inputting an image having a plurality of pages;

said determining step includes determining the image type of the input image in units of a page; and said controlling step includes controlling the recording mode in units of a page.

36. A computer readable medium having recorded thereon executable codes for implementing a computer implementable image processing method comprising:

an inputting step, of inputting an image of one of a plurality of image types;

an image processing step, of generating recording image data based on the input image, the image processing step including generating any of first recording image data for unconditionally decimating the image data, and second recording image data for conditionally decimating the image data;

a selecting step, of selecting by an operator a recording mode from among a first recording mode, for and recording the first recording image data on a recording material, a second recording mode, for recording the second recording image data on the recording material, and a third recording mode, for recording third recording image data;

a determining step, of determining if the image is a predetermined image type; and a controlling step, of changing to the third recording mode which carries out neither unconditional nor conditional decimation, when the input image is a monochrome halftone image type, whereby the first recording mode which carries out unconditional decimation as selected by the operator is canceled.

37. A computer readable medium according to claim 36, further comprising a recording step, of recording the first, second, or third recording image data.

38. A computer readable medium according to claim 36, wherein said inputting step includes inputting one-pixel binary image data.

39. A computer readable medium according to claim 36, wherein said inputting step includes inputting binary data received from another communication apparatus or binary data obtained by binarizing multi-valued image data obtained by reading a subject copy.

40. A computer readable medium according to claim 36, wherein the predetermined image type is a color image, and said determining step includes determining whether the input image is a monochrome image or a color image; and
said controlling step includes changing to the third recording mode, when the first or the second recording mode is selected, and it is determined in said determining step that the input image is a color image whereby the selected recording mode is canceled.

41. A computer readable medium according to claim 36, wherein:
said inputting step includes inputting an image having a plurality of pages;
said determining step includes determining the image type of the input image in units of a page; and
said controlling step includes controlling the recording mode in units of a page.

42. An image processing apparatus comprising:
input means for inputting an image that is a color image or a monochrome image;
image processing means for generating a recording image data based on the input image, the image processing means being capable of generating first recording image data for recording the image on a recording material at a predetermined recording density, and of generating second recording image data for recording the image on a recording material at a recording density lower than that of the first recording image data, by reducing the number of recording dots through decimation;
selecting means for use of an operator in selecting a recording mode from among a normal recording mode, for recording the first recording image data, and a decimation recording mode, for recording the second recording image data;
determining means for determining if the input image is a color image or a monochrome image; and
control means for changing to the normal recording mode, when the decimation recording mode is selected by said selecting means and said determining means determines that the input image is a color image type or a monochrome halftone type whereby the recording mode which carries out said decimation for generating deterioration for image gradation selected by the operator is canceled.

43. An image processing method comprising:
an inputting step, of inputting an image that is a color image or a monochrome image;
an image processing step, of generating recording image data based on the input image, the image processing step including generating any of first recording image data, for recording the image on a recording material at a predetermined recording density, and second recording image data for recording the image on a recording material at a recording density lower than that of the first recording image data, by reducing the number of recording dots through decimation;
a selecting step, of an operator selecting a recording mode from among a normal recording mode, for recording the first recording image data, and a decimation recording mode, for recording the second recording image data;
a determining step, of determining if the input image is a color image or a monochrome image; and
a controlling step, of changing to the normal recording mode, when the decimation recording mode is selected in said selecting step and said determining step determines that the input image is a color image type or a monochrome halftone type whereby the recording mode which carries out said decimation for generating deterioration for image gradation selected by the operator is canceled.

44. A computer readable medium having recorded thereon executable codes for implementing a computer implementable image processing method comprising:
an inputting step, of inputting an image that is a color image or a monochrome image;
an image processing step, of generating recording image data based on the input image, the image processing step including generating any of first recording image data, for recording the image on a recording material at a predetermined recording density, and second recording image data for recording the image on a recording material at a recording density lower than that of the first recording image data, by reducing the number of recording dots through decimation;
a selecting step, of an operator selecting a recording mode from among a normal recording mode, for recording the first recording image data, and a decimation recording mode, for recording the second recording image data;
a determining step, of determining if the input image is a color image or a monochrome image; and
a controlling step, of changing to the normal recording mode, when the decimation recording mode is selected in said selecting step and it is determined in said determining step that the input image is a color image type or a monochrome halftone type whereby the recording mode which carries out said decimation for generating deterioration for image gradation selected by the operator is canceled.

* * * * *

UNITED STATES PATENT AND TRADEMARK OFFICE
CERTIFICATE OF CORRECTION

| | | |
|---|---|---|
| PATENT NO. | : 7,130,064 B1 | Page 1 of 1 |
| APPLICATION NO. | : 09/598201 | |
| DATED | : October 31, 2006 | |
| INVENTOR(S) | : Koji Okamura et al. | |

It is certified that error appears in the above-identified patent and that said Letters Patent is hereby corrected as shown below:

TITLE PAGE:
(56) References Cited, FOREIGN PATENT DOCUMENTS,
"JP 08130637 A * 5/1996" should be deleted;
"JP 10097161 A * 4/1998" should read -- JP 10-97161 A * 4/1998 --; and
"JP 11099728 A * 4/1999" should read -- JP 11-99728 A * 4/1999 --.

COLUMN 1:
Line 64, "beautifully" should read -- beautiful --.

COLUMN 12:
Line 58, "and" should be deleted.

Signed and Sealed this

Twenty-sixth Day of June, 2007

JON W. DUDAS
*Director of the United States Patent and Trademark Office*